(12) United States Patent
Jeffrey

(10) Patent No.: US 11,379,864 B2
(45) Date of Patent: Jul. 5, 2022

(54) DOUBLE BLIND WINE TASTING

(71) Applicant: Cliink LLC, New York, NY (US)

(72) Inventor: Scott Jeffrey, New York, NY (US)

(73) Assignee: CLIINK LLC, New York, NY (US)

( * ) Notice: Subject to any disclaimer, the term of this patent is extended or adjusted under 35 U.S.C. 154(b) by 221 days.

(21) Appl. No.: 16/007,059

(22) Filed: Jun. 13, 2018

(65) Prior Publication Data

US 2018/0365719 A1 Dec. 20, 2018

Related U.S. Application Data

(60) Provisional application No. 62/519,589, filed on Jun. 14, 2017, provisional application No. 62/642,849, filed on Mar. 14, 2018.

(51) Int. Cl.
G06Q 30/02 (2012.01)
(52) U.S. Cl.
CPC .................. *G06Q 30/0203* (2013.01)
(58) Field of Classification Search
CPC .................................................. G06Q 30/0203
USPC ........................................................ 705/7.32
See application file for complete search history.

(56) References Cited

U.S. PATENT DOCUMENTS

| | | | |
|---|---|---|---|
| 5,314,560 A | 5/1994 | Pritchet | |
| 5,800,893 A | 9/1998 | Harden | |
| 5,918,882 A | 7/1999 | Truong | |
| 6,581,973 B2 | 6/2003 | Levine et al. | |
| 6,718,733 B2 | 4/2004 | Kilmartin | |
| 7,610,872 B2 | 11/2009 | Coppola et al. | |
| 8,220,187 B2 | 7/2012 | Rosen | |
| 8,321,261 B2 | 11/2012 | Gross | |
| 9,092,999 B1 | 7/2015 | Harruff et al. | |
| 9,111,465 B2 | 8/2015 | Farell | |

(Continued)

FOREIGN PATENT DOCUMENTS

| | | |
|---|---|---|
| CA | 2841636 A1 | 7/2015 |
| DE | 20307858 U1 | 8/2003 |

(Continued)

OTHER PUBLICATIONS

Jeffrey C. Bodington, "Evidence on Preferences, Randomness, and Value from Double-Blind Wine Tastings", Sep. 10, 2012Journal of Wine Economics, vol. 7, No. 2, 2012, pp. 181-191 (Year: 2012).*

(Continued)

*Primary Examiner* — Abdallah A El-Hage Hassan
(74) *Attorney, Agent, or Firm* — Cowan, Liebowitz & Latman, P.C.; Mark Montague; Brian S. Matross

(57) ABSTRACT

A method of executing a double blind wine tasting event comprises providing a plurality of distinct wine bottles, a plurality of identical sleeves and a plurality of distinct covers. A first person places each of the wine bottles in a respective sleeve, with each of the sleeves including a respective distinct identifier. The first person keeps track of which wine bottle is placed in which sleeve. A second person then masks each of the identifiers with a respective cover, with each of the covers being removably attachable to the sleeves. The second person keeps track of which cover is masking which identifier. After these steps are carried out, a location of each of the wine bottles within the sleeves is unknown to every one of the participants. A plurality of carafes may be used as an alternative to the sleeves.

4 Claims, 17 Drawing Sheets

(56) References Cited

U.S. PATENT DOCUMENTS

| | | | |
|---|---|---|---|
| 9,302,815 B2 | 4/2016 | Shaw et al. | |
| 9,433,310 B1 | 9/2016 | Roig | |
| 9,494,566 B2 | 11/2016 | Tompkins | |
| 2003/0059609 A1 | 3/2003 | Rodgers | |
| 2003/0230019 A1 | 12/2003 | Olivera | |
| 2004/0026858 A1 | 2/2004 | Murphy et al. | |
| 2005/0199579 A1 | 9/2005 | Novak | |
| 2005/0229450 A1 | 10/2005 | Larsen et al. | |
| 2006/0026879 A1 | 2/2006 | Tebaldi | |
| 2006/0028014 A1 | 2/2006 | McQueeny | |
| 2006/0107563 A1* | 5/2006 | Farnsworth | G09F 3/0288 40/310 |
| 2006/0225637 A1* | 10/2006 | Coppola | G09F 23/08 116/200 |
| 2007/0282696 A1* | 12/2007 | Strodtman | G06Q 30/0635 705/26.81 |
| 2008/0011794 A1* | 1/2008 | Daniel | A45F 5/022 224/267 |
| 2008/0128429 A1 | 6/2008 | Towery | |
| 2008/0217388 A1 | 9/2008 | Brayshaw | |
| 2008/0254173 A1* | 10/2008 | Woods | G01N 33/14 99/285 |
| 2009/0015000 A1 | 1/2009 | Wolfe | |
| 2009/0026167 A1* | 1/2009 | Metry | G09F 3/0288 215/386 |
| 2009/0029085 A1 | 1/2009 | Harruff | |
| 2009/0100726 A1 | 4/2009 | Regas | |
| 2009/0288746 A1* | 11/2009 | Baca | A45C 1/06 150/145 |
| 2010/0017305 A1 | 1/2010 | Strodtman | |
| 2010/0060955 A1* | 3/2010 | Saliba | H04N 1/00827 358/493 |
| 2010/0236119 A1 | 9/2010 | Pellei | |
| 2010/0307947 A1 | 12/2010 | Marden | |
| 2011/0247963 A1* | 10/2011 | Stockett | G09B 23/288 206/572 |
| 2011/0287133 A1* | 11/2011 | Ortega | C12G 1/00 426/87 |
| 2011/0293793 A1 | 12/2011 | Strodtman | |
| 2012/0298544 A1 | 11/2012 | Capdevila | |
| 2013/0062872 A1 | 3/2013 | Sheridan | |
| 2013/0069359 A1 | 3/2013 | Sawinski | |
| 2013/0167415 A1 | 7/2013 | Old | |
| 2014/0124516 A1 | 5/2014 | Hsueh | |
| 2014/0199000 A1 | 7/2014 | Chiorazzi et al. | |
| 2015/0161918 A1 | 6/2015 | Byrne | |
| 2015/0231911 A1 | 8/2015 | Smith | |
| 2015/0336415 A1 | 11/2015 | Fetters | |
| 2016/0217713 A1 | 7/2016 | Kranker | |
| 2017/0010247 A1 | 1/2017 | Tompkins | |

FOREIGN PATENT DOCUMENTS

| | | |
|---|---|---|
| DE | 202016003423 U1 | 7/2016 |
| EP | 1750239 A1 | 2/2007 |
| EP | 2085949 B1 | 4/2011 |
| EP | 2706522 A1 | 3/2014 |
| FR | 2995118 A1 | 3/2014 |
| GB | 2296703 A | 1/1996 |
| GB | 2341136 A | 8/2000 |
| GB | 2442463 A | 4/2008 |
| KR | 20120004333 U | 6/2012 |
| WO | 2005/051503 A1 | 6/2005 |
| WO | 2010041049 A1 | 4/2010 |

OTHER PUBLICATIONS

Jeffrey C. Bodington, "804 Tastes: Evidence on Preferences, Randomness, and Value from Double-Blind Wine Tastings", Journal of Wine Economics, vol. 7, No. 2, 2012, pp. 181-191 doi:10.1017/jwe.2012.20. First published online Sep. 10, 2012 (Year: 2012).*

Ingram Olkin a, Ying Lou b, Lynne Stokes c and Jing Cao, "Analyses of Wine-Tasting Data: A Tutorial", Journal of Wine Economics, p. 1 of 27 doi:10.1017/jwe.2014.26. 2014. (Year: 2014).*

Felipe Reinoso Carvalho, "Music Influences Hedonic and Taste Ratings in Beer" Original Research article Front. Psychol., May 6, 2016 https://doi.org/10.3389/fpsyg.2016.00636 (Year: 2016).*

The above references were cited in the International Search Report of the corresponding International Application, PCT/US2018/037271 dated Nov. 15, 2018.

Sunny Brown, The Art of Blind Tasting, Winegeeks.com, articles/29, 2 pages.

Feed By Round Pound, How to Host a Blind Tasting, The Wayback Machine, 3 pages.

* cited by examiner

FRUITINESS – Tasting Round #1
Sauvignon Blanc Grape

| Tasting Team | | |
|---|---|---|
| Wine Name | Sancerre | Sauvignon Blanc |
| Country, State, or Region | Loire Valley | New Zealand |
| Global Category | Old World | New World |

IMPRESSION
Score as INDIVIDUALS. Record as a number from *75 to 100*.

Score
100-Sublime  85-Special
95-Classic   80-Solid
90-Superior  75-Drinkable

OBSERVATION of APPEARANCE
Observe as a TEAM. Record as *Straw*, *Green Hints* or *Gold*.

| Color | | |
|---|---|---|

OBSERVATION of NOSE
Observe as a TEAM. Compare the two wines. Record one as *Muted* and the other as *Aromatic*.

| Aromatic Intensity | | |
|---|---|---|

Observe as a TEAM. Record one or more aromas.
If you find it difficult to identify a specific aroma, please record the aroma family instead.
If you observe aromas that are not suggested below, please record them as well.

Aroma Family        Specific Aromas
*Fruit*                 *Grapefruit*
*Mineral*               *Flint, Chalk*
*Vegetal*               *Grass*

| Aromas | | |
|---|---|---|

OBSERVATION of PALATE
Observe as a TEAM. Compare the two wines. Record one as *Subtle* and the other as *Upfront*.

| Fruitness | | |
|---|---|---|

Rev. 4.2    Copyright © 2018 Cliink LLC. All Rights Reserved.

FIG. 1A

FRUITINESS – Tasting Round #2
Chardonnay Grape

| Tasting Team | | |
|---|---|---|
| Wine Name | Chablis | Chardonnay |
| Country, State, or Region | Burgundy | California |
| Global Category | Old World | New World |

IMPRESSION

Score as INDIVIDUALS. Record as a number from _75 to 100_.

Score:
- 100-Sublime   85-Special
- 95-Classic     80-Solid
- 90-Superior   75-Drinkable

| | | |
|---|---|---|
| | | |

OBSERVATION of APPEARANCE

Observe as a TEAM. Compare the two wines. Record one as _Straw_ and the other as _Gold_.

| Color | | |
|---|---|---|

OBSERVATION of NOSE

Observe as a TEAM. Compare the two wines. Record one as _Muted_ and the other as _Aromatic_.

| Aromatic Intensity | | |
|---|---|---|

Observe as a TEAM. Record one or more aromas.

| Aroma Family | Specific Aromas |
|---|---|
| _Fruit_ | _Yellow Apple, Pineapple_ |
| _Mineral_ | _Chalk_ |
| _Wood_ | _Oak_ |
| _Spice_ | _Vanilla_ |
| _Toasted_ | _Butter, Toast_ |

| Aromas | | |
|---|---|---|

OBSERVATION of PALATE

Observe as a TEAM. Record as _Subtle_ or _Upfront_.

| Fruitiness | | |
|---|---|---|

Rev. 4.2   Copyright © 2018 Cliink LLC. All Rights Reserved.

FIG. 1B

FRUITINESS – Tasting Round #3
Riesling Grape

| Tasting Team | | |
|---|---|---|
| Wine Name | Riesling Spätlese | Riesling |
| Country, State, or Region | Germany | Australia |
| Global Category | Old World | New World |

| IMPRESSION | | |
|---|---|---|
| Score 100-Sublime 85-Special / 95-Classic 80-Solid / 90-Superior 75-Drinkable | | |

OBSERVATION of APPEARANCE
Record as *Straw*, *Green Hints* or *Gold*.

| Color | | |
|---|---|---|

OBSERVATION of NOSE
Record as *Muted* or *Aromatic*.

| Aromatic Intensity | | |
|---|---|---|

Record one or more aromas.

Aroma Family     Specific Aromas
*Fruit*     *Peach, Apricot, Green Apple, Lime, Pineapple*
*Mineral*     *Slate, Petrol*
*Spice*     *White Pepper*

| Aromas | | |
|---|---|---|
|  |  |  |

OBSERVATION of PALATE
Record as *Subtle* or *Upfront* / *Fruit Forward*.

| Fruitiness | | |
|---|---|---|

Compare the two wines. Record one as *Dry* and the other as *Sweet*.

| Sweetness | | |
|---|---|---|

Rev. 4.2      Copyright © 2018 Cliink LLC. All Rights Reserved.

FIG. 1C

FRUITINESS: Recognition Challenge

| WINE | EMBLEM |
|---|---|
| ☐ Sancerre <br> Loire Valley | ☐ Leaf ☐ White Bee ☐ Butterfly <br> ☐ Grapes ☐ Red Bee ☐ Dragonfly |
| Characteristics | |
| ☐ Sauvignon Blanc <br> New Zealand | ☐ Leaf ☐ White Bee ☐ Butterfly <br> ☐ Grapes ☐ Red Bee ☐ Dragonfly |
| Characteristics | |
| ☐ Chablis <br> Burgundy | ☐ Leaf ☐ White Bee ☐ Butterfly <br> ☐ Grapes ☐ Red Bee ☐ Dragonfly |
| Characteristics | |
| ☐ Chardonnay <br> California | ☐ Leaf ☐ White Bee ☐ Butterfly <br> ☐ Grapes ☐ Red Bee ☐ Dragonfly |
| Characteristics | |
| ☐ Riesling Spätlese <br> Germany | ☐ Leaf ☐ White Bee ☐ Butterfly <br> ☐ Grapes ☐ Red Bee ☐ Dragonfly |
| Characteristics | |
| ☐ Riesling <br> Australia | ☐ Leaf ☐ White Bee ☐ Butterfly <br> ☐ Grapes ☐ Red Bee ☐ Dragonfly |
| Characteristics | |

12

Recognition Challenge Instructions
1. Write down distinctive characteristics of each wine before observing.
2. Observe all the wines, looking for those distinctive characteristics.
3. Check the box of the appropriate emblem when you recognize a wine.
4. Proceed to the Big Reveal when everyone is satisfied with their guesses.
5. Check the box next to each wine that you correctly recognized.
6. Celebrate your newfound wine recognition abilities with a Cliink cheers!

FRUITINESS: Host Single Blind

| WINE | NUMBER |
|---|---|
| Sancerre<br>Loire Valley | |
| Sauvignon Blanc<br>New Zealand | |
| Chablis<br>Burgundy | |
| Chardonnay<br>California | |
| Riesling Spätlese<br>Germany | |
| Riesling<br>Australia | |

30

Host Instructions

To Single Blind the Wines:
1. Work in private where no one else can see the wines.
2. Randomly choose one of the wines and cover it with the wine sleeve marked with the number "1".
3. Write down the number "1" on this card to the right of the name of the wine you just covered.
4. Repeat the process using wine sleeves marked "2" through "6".
5. Rearrange the wine bottles in ascending order of "1" through "6".
6. Leave the private area and send your Special Guest for his or her turn to Double Blind the wines.

To Reveal the Wines:
1. Your Guide will announce the first wine to be revealed.
2. Reveal the number of that wine by consulting this card.
3. Your Special Guest will then reveal the emblem of that number.
4. Repeat the process as your Guide announces the remaining wines.

FIG. 3

FRUITINESS: Special Guest Double Blind

| NUMBER | EMBLEM | | |
|---|---|---|---|
| 1 | ☐ Leaf  ☐ Grapes | ☐ White Bee  ☐ Red Bee | ☐ Butterfly  ☐ Dragonfly |
| 2 | ☐ Leaf  ☐ Grapes | ☐ White Bee  ☐ Red Bee | ☐ Butterfly  ☐ Dragonfly |
| 3 | ☐ Leaf  ☐ Grapes | ☐ White Bee  ☐ Red Bee | ☐ Butterfly  ☐ Dragonfly |
| 4 | ☐ Leaf  ☐ Grapes | ☐ White Bee  ☐ Red Bee | ☐ Butterfly  ☐ Dragonfly |
| 5 | ☐ Leaf  ☐ Grapes | ☐ White Bee  ☐ Red Bee | ☐ Butterfly  ☐ Dragonfly |
| 6 | ☐ Leaf  ☐ Grapes | ☐ White Bee  ☐ Red Bee | ☐ Butterfly  ☐ Dragonfly |

50

Special Guest Instructions

To Double Blind the Wines:
1. Work in private where no one else can see the wines.
2. Randomly choose one of the emblems and use it to cover the number "1" on the first wine sleeve.
3. Check the box next to that emblem in row number "1" on this card.
4. Repeat the process for the remaining emblems, covering the numbers "2" through "6" on the appropriate wine sleeves.
5. Rearrange the wine bottles in the order of Leaf, Grapes, White Bee, Red Bee, Butterfly and Dragonfly.
6. The wines are now Double Blinded.

To Reveal the Wines:
1. Your Guide will announce the first wine to be revealed.
2. Your Host will then reveal the number of that wine.
3. Reveal the emblem of that number by consulting this card.
4. Repeat the process as your Guide announces the remaining wines.

FIG. 5

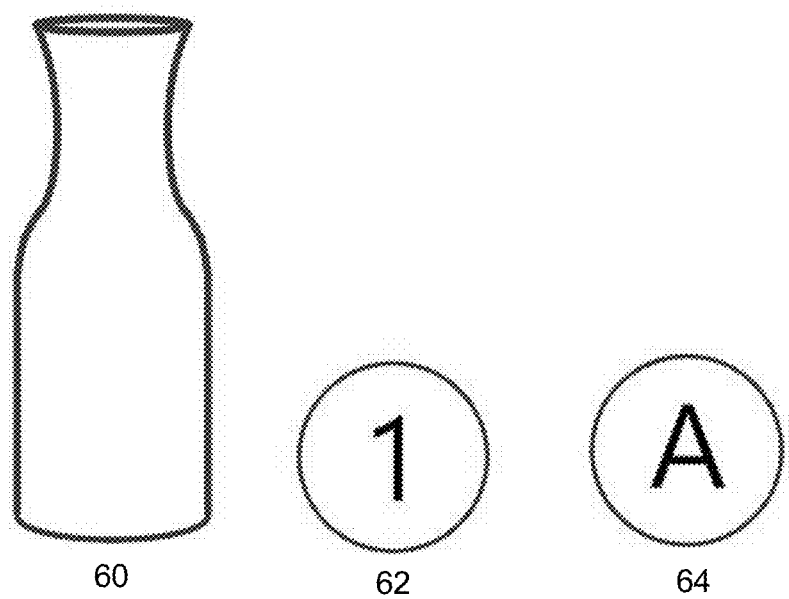
FIG. 6A
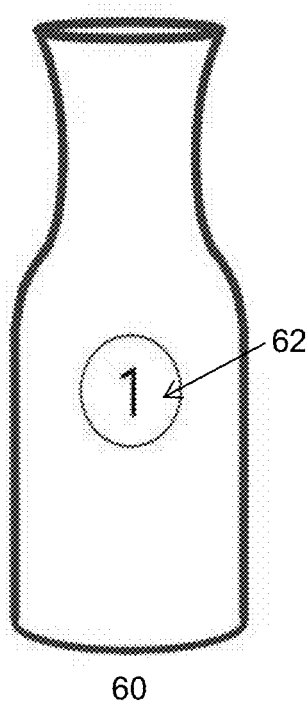 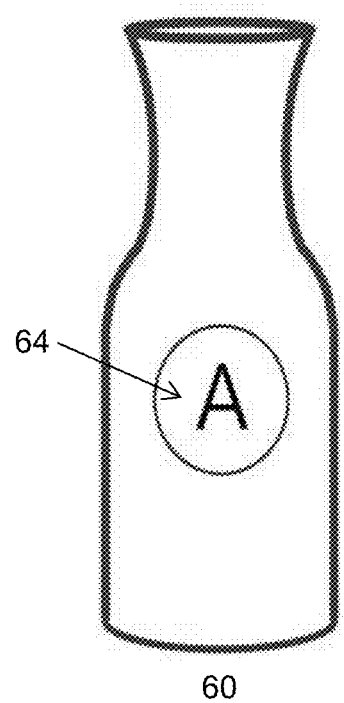
FIG. 6B  FIG. 6C

FRUITINESS – Recognition Challenge

Tasting Team: _____

| ID | WINE | LETTER |
|---|---|---|
| ☐ | Sancerre — Loire Valley | |
| ☐ | Sauvignon Blanc — New Zealand | |
| ☐ | Chablis — Burgundy | |
| ☐ | Chardonnay — California | |
| ☐ | Riesling Spätlese — Germany | |
| ☐ | Riesling — Australia | |

| WINE | COLOR | INTENSITY | AROMAS | FRUIT | SWEET |
|---|---|---|---|---|---|
| Sancerre | Green Hints | Muted | Flint, Grass, Chalk | Subtle | Dry |
| Sauvignon Blanc | Green Hints | Aromatic | Grapefruit, Grass | Upfront | Dry |
| Chablis | Straw | Muted | Chalk, Yellow Apple, Pineapple | Subtle | Dry |
| Chardonnay | Gold | Aromatic | Oak, Butter, Vanilla, Yellow Apple, Pineapple | Subtle | Dry |
| Riesling Spätlese | Straw (Gold) | Aromatic | Peach, Apricot, Slate, Green Apple | Upfront | Sweet |
| Riesling | Straw (Green) | Aromatic | Green Apple, Petrol, White Pepper | Upfront | Dry |

Recognition Challenge Instructions
1. Observe the six wines, looking for their distinctive characteristics.
2. When you believe you have recognized a wine, record its letter.
3. As each wine is revealed, check its box if you correctly recognized it.
4. Celebrate your new wine recognition talents with a CLiNK™ cheers!

Rev. 4.1         Copyright © 2018 Cliink LLC. All Rights Reserved.

FIG. 7A

FRUITINESS – Blind

| WINE | NUMBER |
|---|---|
| Sancerre <br> Loire Valley | |
| Sauvignon Blanc <br> New Zealand | |
| Chablis <br> Burgundy | |
| Chardonnay <br> California | |
| Riesling Spätlese <br> Germany | |
| Riesling <br> Australia | |

Blind Instructions for the Host

1. Work in a private area where no one else can see the wines and carafes.
2. Line up the six carafes in ascending order from 1 to 6.
3. Assign a number to each wine by writing down the numbers 1 to 6 in a random, non-sequential order in the "Number" column above.
4. Pour the wines into the appropriate carafes corresponding to the numbers that you just assigned.
5. The wines are now blinded so only you know which wine is which.
6. Leave the private area and send your Assistant to double blind the wines.
7. Once the wines are double blinded begin the Recognition Challenge.

Reveal Instructions for the Host

1. Your Guide will announce each wine to be revealed, one at a time.
2. When a wine is announced, you reveal the number assigned to it.
3. Your Assistant then reveals the letter assigned to that number.
4. Everyone consults their Recognition Challenge card and checks the box next to the revealed wine if it was correctly recognized.

Rev. 4.1m                                 Copyright © 2018 Clink LLC. All Rights Reserved.

FIG. 7B

FRUITINESS – Blind

| WINE | NUMBER |
|---|---|
| Sancerre Loire Valley | |
| Sauvignon Blanc New Zealand | |
| Chablis Burgundy | |
| Chardonnay California | |
| Riesling Spätlese Germany | |
| Riesling Australia | |

Blind Instructions for the Host
1. Work in a private area where no one else can see the wines and carafes.
2. Line up the six carafes and place the silver stickers numbered 1 to 6 on them in ascending order.
3. Assign a number to each wine by writing down the numbers 1 to 6 in a random, non-sequential order in the "Number" column above.
4. Pour the wines into the appropriate carafes corresponding to the numbers that you just assigned.
5. The wines are now blinded so only you know which wine is which.
6. Leave the private area and send your Assistant to double blind the wines.

Reveal Instructions for the Host
1. Your Guide will announce each wine to be revealed, one at a time.
2. When a wine is announced, you reveal the number assigned to it.
3. Your Assistant then reveals the letter assigned to that number.
4. Everyone consults their Recognition Challenge card and checks the box next to the revealed wine if it was correctly recognized.

Rev. 4.1  Copyright © 2018 Ciiink LLC. All Rights Reserved.

FIG. 7C

FRUITINESS – Double Blind

| NUMBER | LETTER |
|--------|--------|
| 1 | |
| 2 | |
| 3 | |
| 4 | |
| 5 | |
| 6 | |

Double Blind Instructions for the Assistant

1. Wait for your Host to send you to work in the private area.
2. Assign a letter to each number by writing down the letters A to F in a random, non-alphabetical order in the "Letter" column above.
3. Cover the numbers on the six carafes with the appropriate emblems corresponding to the letters that you just assigned.
4. Rearrange the carafes in alphabetical order from A to F.
5. The wines are now double blinded so no one knows which wine is which.
6. Move the carafes to a public area.
7. Begin the Recognition Challenge.

Reveal Instructions for the Assistant

1. Your Guide will announce each wine to be revealed, one at a time.
2. When a wine is announced, your Host reveals the number assigned to it.
3. You then reveal the letter assigned to that number.
4. Everyone consults their Recognition Challenge card and checks the box next to the revealed wine if it was correctly recognized.

Rev. 4.1m  Copyright © 2018 Cliink LLC. All Rights Reserved.

FIG. 7D

FRUITINESS – Double Blind

| NUMBER | LETTER |
|--------|--------|
| 1 | |
| 2 | |
| 3 | |
| 4 | |
| 5 | |
| 6 | |

Double Blind Instructions for the Assistant
1. Wait for your Host to send you to work in the private area.
2. Assign a letter to each number by writing down the letters A to F in a random, non-alphabetical order in the "Letter" column above.
3. Cover the numbered silver stickers on the six carafes with the appropriate gold stickers corresponding to the letters that you just assigned.
4. Rearrange the carafes in alphabetical order from A to F.
5. The wines are now double blinded so no one knows which wine is which.
6. Move the carafes to a public area.
7. Begin the Recognition Challenge.

Reveal Instructions for the Assistant
1. Your Guide will announce each wine to be revealed, one at a time.
2. When a wine is announced, your Host reveals the number assigned to it.
3. You then reveal the letter assigned to that number.
4. Everyone consults their Recognition Challenge card and checks the box next to the revealed wine if it was correctly recognized.

Rev. 4.1                    Copyright © 2018 Clink LLC. All Rights Reserved.

FIG. 7E

FRUITINESS – Recognition Challenge

Tasting Team: _____

| WINE | PRELIMINARY GUESSES | FINAL |
|---|---|---|
| ☐ Sancerre — Loire Valley | A B C D E F | |
| ☐ Sauvignon Blanc — New Zealand | A B C D E F | |
| ☐ Chablis — Burgundy | A B C D E F | |
| ☐ Chardonnay — California | A B C D E F | |
| ☐ Riesling Spätlese — Germany | A B C D E F | |
| ☐ Riesling — Australia | A B C D E F | |

| WINE | COLOR | INTENSITY | AROMAS | FRUIT | SWEET |
|---|---|---|---|---|---|
| Sancerre | Green Hints | Muted | Flint, Grass, Chalk | Subtle | Dry |
| Sauvignon Blanc | Green Hints | Aromatic | Grapefruit, Grass | Upfront | Dry |
| Chablis | Straw | Muted | Chalk, Yellow Apple, Pineapple | Subtle | Dry |
| Chardonnay | Gold | Aromatic | Oak, Vanilla, Butter, Toast, Yellow Apple, Pineapple | Subtle | Dry |
| Riesling Spätlese | Straw (Gold) | Aromatic | Peach, Apricot, Slate, Lime, Green Apple, (Pineapple) | Upfront | Sweet |
| Riesling | Straw (Green) | Aromatic | Green Apple, Petrol, Lime, (White Pepper) | Upfront | Dry |

Recognition Challenge Instructions

1. Observe the six wines, looking for their distinctive characteristics.
2. When you believe you have recognized a wine, record its letter.
3. As each wine is revealed, check its box if you correctly recognized it.
4. Celebrate your new wine recognition talents with a CLiiNK® toast!

Rev. 4.2  Copyright © 2018 CliiNK LLC. All Rights Reserved.

FIG. 7F

FRUITINESS – Host Blind

| WINE | NUMBER |
|---|---|
| Sancerre Loire Valley | |
| Sauvignon Blanc New Zealand | |
| Chablis Burgundy | |
| Chardonnay California | |
| Riesling Spätlese Germany | |
| Riesling Australia | |

Blind Instructions
1. Line up the six carafes in a private area where no one else can see them.
2. Place the small silver stickers numbered 1 to 6 onto the carafes in ascending order.
3. Assign a secret number to each wine by writing down on this card the numbers 1 to 6 in a random, non-ascending order.
4. Pour the six wines into the carafes corresponding to the numbers that you assigned to the wines.
5. The wines are now Blinded so only you know which wine is which.
6. Leave the private area so your Assistant may double blind the wines.

Reveal Instructions
1. Your Guide will announce each wine to be revealed, one at a time.
2. When a wine is announced, you reveal the number assigned to it.
3. Your Assistant then reveals the letter assigned to that number.
4. Everyone consults their Recognition Challenge card and checks the box next to the revealed wine if it was correctly recognized.

Rev. 4.2         Copyright © 2018 Clink LLC. All Rights Reserved.

FIG. 7G

FRUITINESS – Assistant Double Blind

| NUMBER | LETTER |
|---|---|
| 1 | |
| 2 | |
| 3 | |
| 4 | |
| 5 | |
| 6 | |

Double Blind Instructions
1. Wait for your Host to blind the wines before going to the private area.
2. Assign a secret letter to each number by writing down on this card the letters A to F in a random, non-alphabetical order.
3. Cover the small silver stickers on the carafes with the large gold stickers corresponding to the letters that you assigned to the numbers.
4. Rearrange the carafes in alphabetical order from A to F.
5. The wines are now Double Blinded so no one knows which wine is which.
6. Move the carafes to a public area.
7. Begin the Recognition Challenge.

Reveal Instructions
1. Your Guide will announce each wine to be revealed, one at a time.
2. When a wine is announced, your Host reveals the number assigned to it.
3. You then reveal the letter assigned to that number.
4. Everyone consults their Recognition Challenge card and checks the box next to the revealed wine if it was correctly recognized.

Rev. 4.2                          Copyright © 2018 Clink LLC. All Rights Reserved.

FIG. 7H

DOUBLE BLIND WINE TASTING

CROSS-REFERENCE TO RELATED APPLICATIONS

This application claims priority under 35 U.S.C. § 119(e) to U.S. Provisional Application Ser. No. 62/519,589 filed on Jun. 14, 2017 and 62/642,849 filed on Mar. 14, 2018. The entire contents of each above-noted application is herein incorporated by reference in their entirety.

FIELD OF INVENTION

The present invention relates generally to wine tastings, and more specifically, to a technique and system for conducting a double blind wine tasting.

BACKGROUND

Wine is an alcoholic beverage consumed by tens of millions of Americans in a wide variety of settings: from romantic dinners, to social celebrations, to holiday meals, to solitary relaxation at the end of a long day. Americans have always enjoyed wine—Founding Fathers Benjamin Franklin and Thomas Jefferson were noted enthusiasts—but recently this longstanding affection has blossomed into a committed relationship of seemingly unquenchable passion. Wine consumption has soared with annual sales increasing by 50% in ten years, from $38 billion in 2005 to $56 billion in 2015. Millennials and minorities in particular have embraced wine, with 70% and 50% respective increases in the past twenty years of those who prefer wine over liquor and beer.

Wine is extraordinarily complex. Over 1,300 grape varieties are grown commercially in 42 countries across nearly 900 wine regions of various soils, climates, grape-growing practices and winemaking traditions. There are scores of commonly used wine descriptors. Descriptions of aromas and flavors are limited only by one's imagination—bubblegum, new plastic and old saddle leather are among the more whimsical.

Greater appreciation and enjoyment of wine can be obtained through wine education and sensory development. Wine industry professionals often seek sommelier and Master of Wine certifications through expensive and time-intensive wine classes and training programs. Wine consumers often seek this knowledge and development more informally through wine tastings.

Wine tasting is commonly defined as "the sensory examination and evaluation of wine." Wine tastings are organized events involving the careful observation of multiple wines and recording their characteristics on tasting notes. Wine tastings are both educational and social by providing a wine-focused experience for friends to share together. Wine tastings are often organized by a winery, wine distributor or wine retailer whose primary purpose is selling their product and promoting their business. As such, wine tastings are often run by a wine educator who not only pours the wines but also discusses and answers questions about them, playing the role of brand ambassador.

Blind wine tasting is a special subcategory of wine tasting. Here the participants are kept unaware of the identities of the wines that they are tasting. Blind wine tastings are often conducted to allow for unbiased evaluations. Knowledge of grape variety, wine region, or even price has been shown to subconsciously influence wine observations. Blind wine tastings can also be conducted to test the taster's ability to identify wines. These recognition challenges allow the participants to demonstrate their wine knowledge and sensory sensitivity, sometimes as a requirement to pass an industry certification exam and other times simply for the enjoyment of proving one's abilities.

A perfectly executed traditional blind wine tasting consists of the following three elements:

1) The wine bottles are masked with a sleeve so the wines cannot be identified by their labels.

2) Each sleeve displays a unique identifying symbol so each wine can still be individually referred to.

3) The wines are revealed in a specific order.

For example, six sleeves could display the numbers one through six and be placed over six wine bottles. A taster could then note that wine number three has an intense grapefruit aroma. Finally, New Zealand Sauvignon Blanc could be the first wine revealed by announcing that it is wine number three.

A specific reveal order is needed for the controlled flow of the narrative for educational or dramatic purposes. For instance, New Zealand Sauvignon Blanc is one of the most recognizable wines due to its distinctive grapefruit aroma and so should be revealed first when the goal is to progress from the easiest to identify to the hardest.

The obvious strategy to conduct a perfectly executed blind wine tasting is to have the wine educator record the wine and its associated symbol as he places the sleeves on the bottles to mask them. This way he can later consult his notes and be certain to reveal the wines correctly and in the desired order. This straightforward method is precisely how blind wine tastings are currently conducted.

Wine tastings (whether "blind" or "label seen") are held wherever wine is sold to the general public, including wineries, wine stores, wine bars and restaurants. However, wine tastings are also well suited for private home entertainment due to their social aspect and their relatively minimal requirements of materials, preparation and cleanup.

Entertaining guests at home, like wine consumption, is also trending upward. All recipes magazine concluded in their December 2016 Measuring Cup Report, "A stronger economy, increased fascination with food and cooking, and the evolving cultural shifts of younger generations appear to be expanding the breadth and depth of the occasions when we entertain guests at home."

Common activities for entertaining guests at home include dinner parties, costume parties, movie nights, board games and video games. Hosts are always on the lookout for the latest in thing to share with their guests. Given the continued exponential growth of wine consumption, wine tastings could easily become the next phenomenon in private home entertainment.

Wine tastings can be conducted at home by hiring a wine educator to run the event. One problem with this approach is having a stranger present at an intimate party, and worse, the stranger being placed at the center of attention at the expense of the host. From a business standpoint, this approach is inefficient and not readily scalable since it requires employing one trained and charismatic wine educator for each event.

Alternatively, wine tastings can be conducted at home by purchasing a wine tasting kit and/or wine education videos. When done well, these products can be just as fun and informative as hiring a wine educator. Many of these products incorporate blind wine tastings, again either for unbiased evaluation or for recognition challenge. But this approach has its own problem. The host is unable to participate in the blind wine tasting himself since he is responsible for masking the wines—a task the wine educator would perform—and thus already knows which wine is masked by which sleeve. The host is unable to join in with his guests to fully participate in his own party.

OBJECTS AND SUMMARY OF THE INVENTION

In view of the foregoing, it is an object of the present invention to provide a technique in which every person present at a wine tasting event can participate in the wine tasting. It is a further object of the present invention to provide a technique for masking identities of wines to be tasted in a way such that no one participant knows full whereabouts of the wines to be tasted. It is yet a further object of the present invention to provide a kit including various components that can be used to effectively carry out a double blind wine tasting event.

In accordance with an embodiment of the present invention, a method of executing a double blind wine tasting event with a plurality of participants is provided, in which the method comprises providing a plurality of distinct wine bottles, providing a plurality of identical sleeves, providing a plurality of distinct covers, designating a first person from the plurality of participants, placing, by the first person, each of the wine bottles in a respective sleeve, each of the sleeves including a respective distinct identifier, keeping track, by the first person which wine bottle is placed in which sleeve, designating a second person from the plurality of participants, masking, by the second person, each of the identifiers with a respective cover, each of the covers being removably attachable to the sleeves, and keeping track, by the second person, which cover is masking which identifier. In accordance with the method, a location of each of the wine bottles within the sleeves is unknown to the plurality of participants.

As an aspect of the invention, the method further comprises observing, by the plurality of participants, wine poured from each of the sleeves each containing a respective wine bottle, without revealing which wine bottle is placed in which sleeve, guessing, by the plurality of participants, which sleeves identified by their distinct covers have which wine bottles, selecting a first wine bottle from the plurality of distinct wine bottles to be revealed, announcing, by the first person, the distinct identifier of the sleeve having the first wine bottle, and announcing, by the second person, the distinct cover masking the identifier announced by the first person.

As another aspect, the method further comprises rearranging, by the first person, immediately after placing the wine bottles in the respective sleeves, the sleeves in a manner that is unknown to the second person.

As another aspect, the method further comprises rearranging, by the second person, either immediately before or immediately after masking the identifiers, the sleeves in a manner that is unknown to the first person.

As another aspect, each of the sleeves is configured to completely enclose the respective wine bottle placed therein so as to completely hide identities of the respective wine bottle and each of the covers is configured to completely mask the respective identifier on the respective sleeve.

As a further aspect, the identifiers are one of a set of distinct numbers and a set of distinct designs and the covers are the other of the set of distinct numbers and the set of distinct designs.

As yet another aspect, each of the sleeves includes a magnetic material and each of the covers is magnetically removably attached to a respective sleeve.

As yet a further aspect, each of the sleeves includes one of a Velcro hook and a Velcro loop and each of the covers includes the other of the Velcro hook and the Velcro loop for releasably attaching to a respective sleeve.

As still yet another aspect, each of the sleeves includes a transparent pocket open at one side visibly enclosing one of a distinct number and a distinct design and each of the covers is configured as a card having thereon the other of the distinct number and the distinct design slidably insertable into the pocket via the one open side.

As still yet a further aspect, the method further comprises, prior to the placing step, conducting a label-seen tasting round in which each of the participants tastes wine from each of the plurality of wine bottles to learn characteristics of each of the wine tasted.

As a variation to this embodiment, when each of the sleeves does not include a respective distinct identifier, the method further comprises attaching, by the first person, immediately after placing the wine bottles into the respective sleeves, a cover having a distinct number on each of the sleeves and masking, by the second person, each of the covers having the distinct number with a respective cover having a distinct symbol.

As another variation to this embodiment, when each of the sleeves does not include a respective distinct identifier, the method further comprises attaching, by the first person, immediately after placing the wine bottles into the respective sleeves, a wine bottle charm having a distinct number on each of the sleeves and masking, by the second person, each of the wine bottle charms having the distinct number with a respective cover having a distinct symbol.

As yet another variation to this embodiment, the second person, instead of masking each of the identifiers with a respective cover and keeping track of which cover is masking which identifier, pouring wines from each of the sleeves into a respective wine glass, each wine glass having a unique wine charm attached thereto and keeping track of which wine from which wine sleeve is poured into which wine glass having which wine charm.

In accordance with another embodiment of the present invention, a method of executing a double blind wine tasting event with a plurality of participants is provided, in which the method comprises providing a plurality of distinct wine bottles, providing a plurality of identical carafes, providing a plurality of distinct covers, designating a first person from the plurality of participants, pouring, by the first person, wine each of the wine bottles in a respective carafe, each of the carafes including a respective distinct identifier, keeping track, by the first person which wine is poured into which carafe, designating a second person from the plurality of participants, masking, by the second person, each of the identifiers with a respective cover, each of the covers being removably attachable to the carafes, and keeping track, by the second person, which cover is masking which identifier. In accordance with the method, an identity of each of the wine poured into the carafes is unknown to the plurality of participants.

As an aspect of this embodiment, the method further comprises observing, by the plurality of participants, the wine poured into the carafes, without revealing which wine is poured into which carafe, guessing, by the plurality of participants, which carafes identified by their distinct covers have the wine poured from which wine bottles, selecting a first wine bottle from the plurality of distinct wine bottles to be revealed, announcing, by the first person, the distinct identifier of the carafe having the wine poured from the first wine bottle, and announcing, by the second person, the distinct cover masking the identifier announced by the first person.

As another aspect, the identifiers are one of a set of distinct numbers and a set of distinct designs and the covers are the other of the set of distinct numbers and the set of distinct designs.

As a further aspect, each of the carafes is embedded with a magnetic material and each of the covers is magnetically removably attached to a respective carafe.

As yet another aspect, the identifiers are a first set of stickers removably attachable to the carafes and the covers are a second set of stickers removably attachable over the first set of stickers.

As yet a further aspect, each of the carafes includes a transparent pocket open at one side visibly enclosing one of a distinct number and a distinct design and each of the covers is configured as a card having thereon the other of the distinct number and the distinct design slidably insertable into the pocket via the one open side.

As still yet another aspect, the method further comprises, prior to the pouring step, conducting a label-seen tasting round in which each of the participants tastes wine from each of the plurality of wine bottles to learn characteristics of each of the wine tasted.

As still yet another aspect, the method further comprises rearranging, by the second person, either immediately before or immediately after masking the identifiers, the carafes in a manner that is unknown to the first person.

As a variation to this embodiment, when each of the carafes does not include a respective distinct identifier, the method further comprises attaching, by the first person, immediately before pouring the wine into the respective carafes, a cover having a distinct number on each of the sleeves and masking, by the second person, each of the covers having the distinct number with a respective cover having a distinct symbol.

As another variation to this embodiment, when each of the carafes does not include a respective distinct identifier, the method further comprises attaching, by the first person, immediately before pouring the wine into the respective carafes, a wine bottle charm having a distinct number on each of the sleeves and masking, by the second person, each of the wine bottle charms having the distinct number with a respective cover having a distinct symbol.

As yet another variation to this embodiment, when each of the carafes does not include a respective distinct identifier, the method further comprises attaching, by the first person, immediately before pouring the wine into the respective carafes, an elastic band having a distinct number on each of the carafes and masking, by the second person, each of the elastic bands having the distinct number with another elastic band having a distinct symbol.

In accordance with another embodiment of the present invention, a kit for executing double blind wine tasting event with a plurality of participants is provided. The kit comprises a plurality of identical sleeves, each of the sleeves including a distinct identifier and configured to enclose therein a wine bottle, a plurality of covers, each of the covers being configured to be removably attached to the sleeves and configured to mask a respective identifier on each of the sleeves when attached to the sleeves, at least one Host Card configured to allow one of the plurality of participants to record which sleeve is holding which wine bottle, at least one Special Guest Card configured to allow another of the plurality of participants to record which cover is masking which identifier, and a plurality of Recognition Challenge Cards configured to allow the plurality of participants to record guesses about which sleeve identified by its cover is holding which wine bottle during the double blind wine tasting event.

As an aspect of this embodiment, the kit further comprises an instruction material configured to instruct at least one person from the plurality of participants to carry out the following steps in order to execute the double blind wine tasting event: providing a plurality of wine bottles, designating a first person from the plurality of participants, placing, by the first person, each of the wine bottles in a respective sleeve provided, keeping track, by the first person, which wine bottle is placed in which sleeve, designating a second person from the plurality of participants, masking, by the second person, each of the identifiers with a respective cover provided, and keeping track, by the second person, which cover is masking which identifier. In accordance with this aspect, a location of each of the wine bottles within the sleeves is unknown to the plurality of participants.

As a feature of this aspect, the instruction material is a video clip pre-recorded by a guide providing verbal instructions for executing the double blind wine tasting event.

As another aspect of this embodiment, the kit further comprises a plurality of Tasting Notes Cards configured to allow the plurality of participants to record observations about wine being tasted during a label seen wine tasting event preceding the double blind wine tasting event.

In accordance with yet another embodiment of the present invention, a kit for executing double blind wine tasting event with a plurality of participants is provided, in which the kit includes a plurality of identical carafes, each of the carafes including a distinct identifier and configured to enclose therein wine poured from a wine bottle, a plurality of covers, each of the covers being configured to be removably attached to the carafes and configured to mask a respective identifier on each of the carafes when attached to the carafes, at least one Host Card configured to allow one of the plurality of participants to record which carafe is holding which wine, at least one Special Guest Card configured to allow another of the plurality of participants to record which cover is masking which identifier, and a plurality of Recognition Challenge Cards configured to allow the plurality of participants to record guesses about which carafe identified by its cover is holding the wine poured from which wine bottle during the double blind wine tasting event.

As an aspect of this embodiment, the kit further comprises an instruction material configured to instruct at least one person from the plurality of participants to carry out the following steps in order to execute the double blind wine tasting event: providing a plurality of wine bottles, designating a first person from the plurality of participants, pouring, by the first person, wine from each of the wine bottles into a respective carafe provided, keeping track, by the first person, which wine is poured into which carafe, designating a second person from the plurality of participants, masking, by the second person, each of the identifiers with a respective cover provided, and keeping track, by the second person, which cover is masking which identifier. In accordance with this aspect, an identity of each of the wine poured into the carafes is unknown to the plurality of participants.

As a feature of this aspect, the instruction material is a video clip pre-recorded by a guide providing verbal instructions for executing the double blind wine tasting event.

As another aspect of this embodiment, the kit further comprises a plurality of Tasting Notes Cards configured to allow the plurality of participants to record observations about wine being tasted during a label seen wine tasting event preceding the double blind wine tasting event.

These and other objects, advantages, aspects and features of the present invention are as described below and/or appreciated and well understood by those of ordinary skill in the art.

BRIEF DESCRIPTION OF THE FIGURES

FIGS. 1A-1D show exemplary Tasting Notes Cards and a Recognition Challenge Card in accordance with the present invention.

FIG. 3 shows an exemplary Host Card in accordance with the present invention.

FIG. 5 shows an exemplary Special Guest Card in accordance with the present invention.

FIGS. 6A-6C show another exemplary embodiment using carafes in place of sleeves in accordance with the present invention.

FIGS. 7A-7H show additional variants of the cards used in accordance with the present invention.

DETAILED DESCRIPTION

Figure 2A:
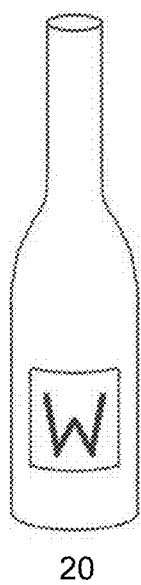
FIGS. 2A-2B show an exemplary embodiment including an exemplary wine bottle and the exemplary wine bottle being placed within a sleeve in accordance with the present invention.

The embodiments of the present invention as described herein solve the above noted problem, allowing for a perfectly executed, at-home blind wine tasting without a wine educator, in which everyone—including the host—can participate. Incorporated as an integral part of at-home wine tasting products that now can work flawlessly, the invention will further deepen Americans' love and understanding of wine.

Before providing a detailed description of various embodiments and variations of the present invention, the following definitions are established herein to enhance the reader's understanding of the different aspects of the present invention:

"Guide" is a wine expert and/or an industry celebrity who appears on previously recorded educational videos about wine. The Guide may lead the tasting but the only interactivity is playing and pausing pre-recorded instruction videos. The Guide is never physically present and thus cannot participate in "blinding" the wines.

"Host" is the party who is having people over for a wine tasting event at his or her location. The Host has in possession a "Kit" for conducting a double blind wine tasting in accordance with the present invention.

"Guests" are two or more people attending the tasting event held by the Host.

"Special Guest" or "Assistant" is the one Guest who assists the Host in hiding and revealing the wines in accordance with the present invention.

"Kit," as will be further described herein, includes a plurality of sleeves, bags, covers, cards and/or other devices which are necessary for operation of the double blind wine tasting in accordance with the present invention.

Finally, as used herein, a "wine charm" attaches to the stem of a wine glass, while a "wine bottle charm" is placed around the neck of a wine bottle.

An exemplary illustration of double blind wine tasting, in accordance with an embodiment of the present invention, is as follows.

A Host invites five Guests and selects one Special Guest from the five Guests. There are six different wines (e.g., Sancerre, New Zealand Sauvignon Blanc, Chablis, California Chardonnay, Riesling Spätlese and Australian Riesling) prepared for six rounds of tasting. As a variation, two wines may be tasted and compared for one round, resulting in only three rounds of tasting with six different wines. As another variation, the Host and the five Guests may play individually or are split up into teams of two to work together.

Before starting the "blind" portion of the wine tasting, the Host and the Guests observe and learn the characteristics of each of the six wines via one or more "label seen" tasting rounds where the wines are known to everyone. In one version, the Host and the Guests observe one wine at a time, writing down or remembering personal observations regarding each of the wines. In a variation, the Host and the Guests observe two wines per open tasting round to compare and contrast different characteristics of the wine. The "label seen" tasting rounds may be optional depending on the Guests' prior knowledge of the wines.

Each "label seen" tasting round begins with the Guide teaching a bit about wine and then explaining how to observe certain characteristics. For instance, the Guide might talk about how for sweet wines the fermentation process is ended early to preserve residual sugar. The Guide then may explain that sweetness can be differentiated from fruitiness as sweetness is tasted on the tongue while fruitiness is a flavor sensed by the nose.

Once the Guide finishes the instructions, the Host and the Guests then begin tasting the wines and recording their observations on a specially designed Tasting Notes Card. In a variation, the Host and the Guests each have their own card to record observations, while in another variation, teams of two share cards. Exemplary Tasting Notes Cards 10 are shown in FIGS. 1A-1C.

As shown in these figures, the card includes space for writing down characteristics for each of the wines in the "label-seen" tasting rounds.

In one version, the Host and the Guests write down their notes on the Tasting Notes Cards during the label-seen tasting rounds and use a Recognition Challenge Card 12 to record their guesses during blind tasting rounds as shown in FIG. 1D. The Host and the Guests may retain their respective Tasting Notes Cards during the blind tasting rounds or may transfer the notes from the Tasting Notes Cards to the Recognition Challenge Card. In another version, the Host and the Guests may use Recognition Challenge Cards during the label-seen tasting rounds to write down their observations.

Once all the observations have been jotted down on the Tasting Notes Cards (or the Recognition Challenge Cards), the Host and the Guests are then allowed to socialize while finishing the wine, after which the next tasting round begins.

Figure 2B:
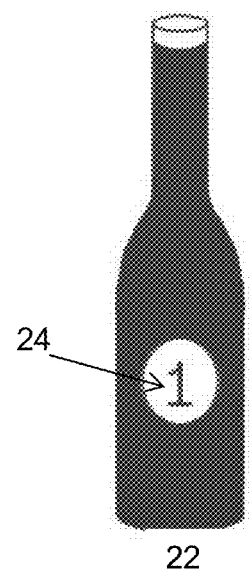

Once all the wines have been observed in "label seen" tasting rounds, the Host begins the "blind" wine tasting by randomly placing each wine bottle in a different identical sleeve (or bag, box, etc.). In accordance with the present invention, the Host initiates the "blinding" of the wine bottles. However, it is also contemplated that any one of the participants of the wine tasting may assume the role of the Host as disclosed herein. An exemplary wine bottle 20 and the wine bottle 20 being placed within an exemplary sleeve 22, the sleeve 22 including an identifier 24, are illustrated in FIGS. 2A and 2B. As shown in FIG. 2B, the sleeve 22 is labeled with an identifier (e.g., numbers, Roman numerals, alphabets, symbols, shapes, etc.).

The Host, while placing each wine bottle in a sleeve, keeps track (e.g., on a Host Card) of which type of wine is in which sleeve. An exemplary Host Card 30 for writing down which wine gets placed in which sleeve is illustrated in FIG. 3. The Host Card 30 is different from a Tasting Notes Card 10. As shown in FIG. 3, the Host Card 30 lists all of the wines currently being used in the double-blind wind tasting and includes space for writing down, for example, that New Zealand Sauvignon Blanc is in sleeve #1, California Chardonnay is in sleeve #2, etc. Once all the wines are tracked, the Host then puts away the Host Card 30.

Figure 4:
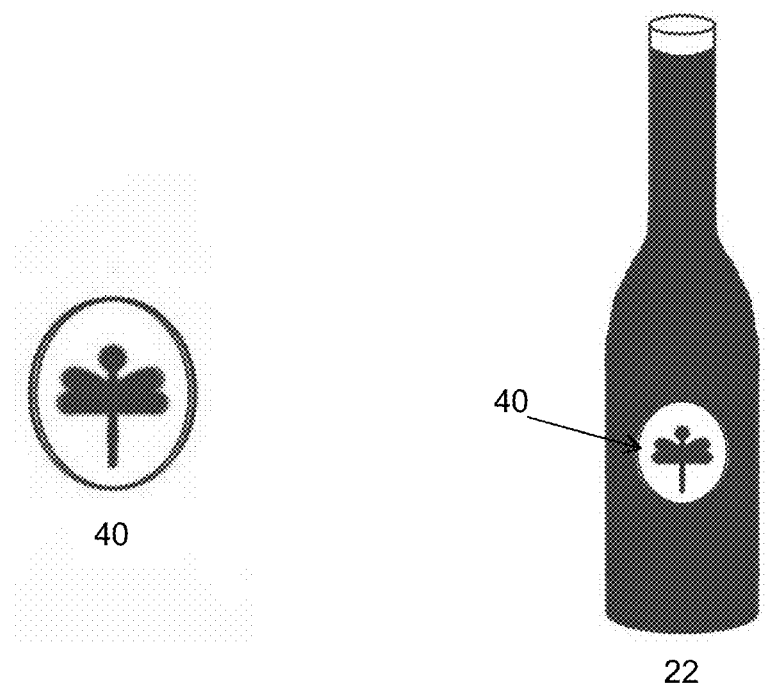
FIG. 4 shows an exemplary cover and the exemplary cover being placed over an identifier on a sleeve in accordance with the present invention.

Once the Host is finished, the six sleeves each containing one wine bottle are passed to the Special Guest (or the Assistant). In one version, before the sleeves are passed to the Special Guest, the sleeves are reordered. The Special Guest then randomly covers each identifier appearing on each of the sleeves with a cover. As will be described herein, the covers can be, for example, a piece of fabric or a printed sticker label with a symbol that is attached to the sleeve via one of variety of adhesive means. FIG. 4 shows an exemplary cover 40 and the cover 40 being placed over the identifier 24 on the sleeve 22 which was shown in FIG. 2.

The Special Guest covers, or masks, each of the identifiers of the sleeve using a different symbol cover and also keeps track (e.g., on a Special Guest Card) of which symbol is covering which number. In accordance with the present invention, the term "mask" is intended to be broadly construed. For example, the phrase "masking an identifier" may be construed as concealing, hiding, disguising, or otherwise covering the identifier so that the identifier is no longer visible.

An exemplary Special Guest Card 50 is shown in FIG. 5. The Special Guest Card is also distinct from a Host Card 30 or a Tasting Notes Card 10, and may also be referred to as an "Assistant Card." As shown, the Special Guest Card 50 lists the identifiers that are on each of the sleeves and also includes space for identifying which symbol cover is covering which number. For example, the Special Guest checks on the Special Guest Card 50 that a dragonfly symbol is covering 1, a leaf symbol is covering 2, etc. The Special Guest then puts away the Special Guest Card 50. In one version, the sleeves are reordered again after the respective covers have been placed on the sleeves.

In another version, the Host first randomly assigns the numbers 1 through 6 to each wine, recording this on the Host Card, and then covers the wine bottles with the respective wine sleeves. The Special Guest in turn first randomly assigns the symbols to each number, recording this on the Special Guest Card, and then masks each of the identifiers on the sleeves with the respective symbol covers.

By doing the above, six wine bottles have been hidden in identical sleeves, with each sleeve identifier also being hidden by respective covers that have different symbols. As a result, both the Host and the Special Guest (and everyone else) do not know what type of wine is in each sleeve.

The Host and the Guest may now attempt to recognize the six blinded wines by observing their characteristics. In one variation, observation consists of only viewing the wines. In another variation, observation includes both viewing and smelling the wines. In a preferred variation, observation includes viewing, smelling, and tasting the wine. In two other variations, observing includes only smelling and tasting the wine or only smelling the wine. When the Host or a Guest believes they have recognized a blinded wine, they record their guess on the Recognition Challenge Card 12 by checking the checkbox next to the name of the symbol cover in that wine's row. For instance, if the Host observes a grapefruit aroma on the wine in the sleeve with the symbol of a dragonfly on its cover and guesses that the wine is New Zealand Sauvignon Blanc, he would then record this guess by checking the checkbox next to Dragonfly in the Sauvignon Blanc row. As a variation, the Host and the five Guests may observe and guess individually or are split up into teams of two to observe and guess together. As another variation, guesses are written down on a Recognition Challenge Card configured with a space to record guesses rather than listing out the six symbols.

Once all the wines have been observed, and all six guesses have been recorded by the Host and the Guests on the Recognition Challenge Cards, the Host plays another video in which the Guide announces the first wine to be revealed. The Guide explains how the first wine should have been recognized by revealing a notable characteristic of the first wine. For instance, the Guide announces that the first wine to be revealed is the New Zealand Sauvignon Blanc and that this wine can be recognized by its intense grapefruit aroma. The Host then looks at the Host Card 30 and reveals what number the Sauvignon Blanc is (e.g., number 1). The Special Guest then looks at the Special Guest Card 50 and reveals what symbol that number is (e.g., a dragonfly). Then everyone, the Host, the Special Guest, and the remaining Guests alike, checks to see if they (or their team) recognized that wine correctly or not. In one variation, wines can be marked as having been correctly recognized by checking a check box next to the name of the wine on the Recognition Challenge Card 12.

The revealing process continues for the remaining five wines. The last two wines can be announced together since when the fifth wine is known, then the sixth wine is also known simultaneously.

The above described process, in accordance with the present invention, allows for a wine tasting event where everyone, including the Host and the Special Guest, can all participate and taste wine without knowing the identity of the wine. Moreover, revealing the identities of the wine in the manner described above provides the additional benefit of preventing any possibility of prematurely revealing other wines. In a traditional blind wine tasting event, the wines are hidden inside a set of numbered sleeves, and when it comes time to reveal a wine (e.g., the New Zealand Sauvignon Blanc), the participants shout out the number that they guessed and that numbered sleeve is checked to see if the guessed wine is contained therein. However, if the guess is wrong, then a different wine is revealed prematurely.

The embodiment as described above is only exemplary and is not intended to unnecessarily limit the broad scope of the present invention. For example, a double blind wine tasting in accordance with the present invention can be carried out with more or fewer than six people and/or six different wines.

As discussed above, the Special Guest places a cover on an identifier that appears on each sleeve. In a variation, magnetic fasteners are used to attach the cover to the sleeve. For example, metallic threads may be woven into the sleeve material and the cover may be magnetic, or vice-versa. As another example, the threads can be woven in only the spot where the number appears, rather than through the sleeve.

As another variation, Velcro fasteners are used to attach the cover to the sleeve. For example, Velcro hook material may be on part of the sleeve where number appears and Velcro loop material may be on the back of the cover, or vice-versa. In another variation, the sleeve may have a clear pocket, or a window, open at one of the sides, positioned over the portion of the sleeve where the identifier (e.g., number) appears. With such configuration, a cover card with an identifying symbol can be slipped into the pocket to hide the number.

In other variations, fastening means such as a snap fastener, a pin, a button and button hole, a butterfly clutch, a clip, a thumbtack, a screw, a pop top, a zipper, a string and grommet, a hook and eye fastener, a clothespin, a paperclip, a circle cotter, an R-clip, a staple, a twist tie or a lobster clasp may be used. Alternatively, an elastic band that fits around the bottle may be used to fasten. Alternatively, any adhesive or sticky material can also be employed. Some fastening means may be a one-time only use scheme whereas other fastening means may be reused again and again with ease.

In a further variation of the above embodiment, the sleeve may not come with an identifier. In such case, the Host places each wine bottle into a sleeve and then randomly attaches a numbered cover on each sleeve. The Special Guest then randomly replaces the numbered covers with symbol covers. In a further variation, the Special Guest overlays the numbered covers with the symbol covers instead of replacing them.

In a further embodiment, instead of numbers appearing on the sleeves, numbered wine bottle charms may be hung by the Host around the neck of the sleeves, the wine bottle charms being numbered one through six. The numbered wine bottle charms can then be replaced with wine bottle charms having unique symbols. In a variation, the numbered wine bottle charms can be overlaid by symbol covers. For example, the wine bottle charms may include magnetic material, have a flat surface and numbered one through six. Magnets with unique symbols can then be placed on top of the wine bottle charms, as a cover, concealing the numbers on the wine bottle charms.

In yet another variation, six bottles of wines and six identical wine glasses are provided. Each of the six wine glasses has a unique wine charm attached to its stem. The wine charms can be traditional wine charms that attach and detach around the stem of the wine glass or non-traditional wine charms which are stickers that are placed on the bowl or foot of the wine glass. The Host places the wine bottles in a respective sleeve each having a respective identifier. The Host keeps track of which wine is placed in which sleeve. The sleeves may be reordered during this step. The Special Guest then pours the wines from each of the sleeves into a respective wine glass, keeping track of which wine sleeve identifier corresponds to which wine charm. This way, the double blind aspect of the present invention is fully achieved.

In yet another variation, six bottles of wines and six identical wine glasses are provided. A table mat with six circles numbered one through six is also provided. The Host pours the wines into a respective wine glass. The Host places each filled glass on one of the circles and keeps track of which wine is placed in which circle by referencing the number of the circle. The Special Guest then places a respective wine charm around each wine glass keeps track of which wine charm is placed around which wine glass by referencing the number of the circle. The Special Guest then rearranges the wine glasses. This way, the double blind aspect of the present invention is fully achieved. In a variation, instead of using a table mat to reference numbers, the wine glasses are lined up and mentally numbered one through six from left to right (or right to left) by both the Host and the Special Guest. The Host still records the numbers on the Host Card.

In yet another variation, six bottles of wines and six identical wine glasses are provided. The wine glasses have a respective wine charm that is attached to respective stems, the wine charms for the six wine glasses being numbered one through six. The Host pours the wines into a respective wine glass. The Host keeps track of which wine is placed in which glass by referencing the numbers of the wine charms. The Special Guest may then overlay the wine charms with symbol covers, keeping track of which cover overlaid which number. As a variation, the Special Guest may replace the first set of numbered wine charms with a second set of wine charms with symbols, keeping track of which symbol replaced which number. This way, the double blind aspect of the present invention is fully achieved.

In a further variation, the wine charms are metallic and numbered one through six. Magnetic covers with symbols can then be placed on the wine charms to cover their numbers.

In further variations, the wine sleeves, bottle charms, wine charms or circles on the table mat are identified by symbols, letters, Roman numerals, shapes, colors, or any indicia rather than numbers. In other variations, the covers, bottle charms or wine charms are identified by numbers, letters, Roman numerals, shapes, colors, or any indicia rather than symbols. The various cards disclosed in accordance with the present invention are adjusted accordingly, with their indicia replaced to match what appears on the wine sleeves and/or covers.

In further variations, the video in which the Guide appears can be broadcast, played on an electronic device, streamed or downloaded. In a variation, the Guide can be presented as an audio recording. In further variations, the actions of the Guide in leading the tasting, teaching, and announcing the wines are performed by a software application, or performed by the Host, and there is no Guide.

In yet a further variation, the actions of the Host and Special Guest in hiding, tracking and revealing the wines can be interchanged.

In still yet a further variation, the actions of the Host and the Special Guest in hiding and revealing the wines may be directed by a software program. For example, the software program may randomly assign numbers to the wines and different symbols to the numbers. In such case, the Host and the Special Guest would not record anything but instead simply follow instructions from the software program. The software program would then announce which wine matches with which symbol at the appropriate time, either textually, visually or audibly. The "double blind" aspect of the present invention still applies and allows the Host to participate since neither the Host nor the Special Guest knows which wine is associated with which symbol.

In still yet another variation, new tasting notes cards specifically designed for each tasting round are provided. The Host and the Guests write down their observations of the wines on these cards. The most notable observations are then copied over onto the Tasting Notes Card (as described previously) after the tasting rounds are completed and prior to the "blind" wine tasting.

In still yet another variation, no "label seen" tasting rounds are conducted at all and the "blind" wine tasting starts immediately. The Host and the Guests attempt to identify the wines based on their immediate observations and prior knowledge about wine, without any reference to having tasted the wines earlier to familiarize themselves with the choices. In a variation, no wine names are provided to choose from and instead the Host and the Guests must name the wines from any wine name that they already know.

In a variation, the Hosts and the Guests must name the wine region, producer, vineyard and/or vintage of the wine, either along with or instead of the wine name. In a variation, the Host and the Guests evaluate the "blinded" wines based on objective qualities and/or subjective personal preferences.

In an exemplary embodiment, as illustrated in accordance with FIGS. 6A-6C, the above described double blind wine tasting process is carried out using wine carafes or decanters rather than wine sleeves. In one or more of the foregoing variations, the use of the sleeves may prematurely reveal the size and the shape of the wine bottles since some wine bottles are more difficult to hide due to their unique bottle size and shape. For instance, wine bottles of Riesling wine are commonly taller in height and narrower in diameter than standard wine bottles. The sleeves will hide the wine bottle labels but may be unable to hide this difference in size and shape, allowing the participants to correctly identify the Riesling wine without any need to observe the wine's characteristics. Pouring the wine from the wine bottles into identical carafes as part of the Host's blinding step solves this problem.

In a preferred version, regular off-the-shelf carafes 60 as shown in FIG. 6A are employed with two sets of stickers 62 and 64. For example, a first set of stickers 62 may be labeled 1 through 6 and a second set of stickers 64 may be labeled A through F. As shown in FIG. 6B, the first set of stickers 62 labeled 1 through 6 are placed on the carafes 60 and wine is poured into them when the Host "single blinds" the wines, and the second set of stickers 64 labeled A through F are placed over the first set of stickers 62 to cover them when the Special Guest "double blinds" the wines. The first set of stickers 62 and the second set of stickers 64 may be the same size or the second set of stickers 64 may be larger than the first set of stickers 62 to ensure that the first set is fully covered. The stickers 62 and 64 may be disposable and used only once or be reusable. The first set of stickers 62 may be magnetic stickers while the second set of stickers 64 may contain magnetically-receptive material, or vice-versa. In an alternative version, the first set of stickers 62 may be removed and replaced with the second set of stickers 64.

In an alternative version of using the carafes, an elastic band that fits around the carafe may be used. A first elastic band may fit around the carafe and a second elastic band may replace or cover the first elastic band. As further variations, the wine bottle charms may be hung around the neck of the carafes or a special mat (or two) may be used to track the carafes.

In a further version, the carafes may be entirely custom-made. Ideally, the carafe would have a circular magnetically-receptive material embedded on the outside and the numbers 1 through 6 would be printed individually on the six carafes. Then, a set of emblems, labeled A through F, made of either flexible magnets or hard custom-shaped magnets would cover the number printed on the carafes. As previously mentioned, the custom-made carafes can also be combined with the elastic band example, the slot-for-emblem example, the snap fastener example, or the screw-on-glass example. Additionally, the custom-made carafes may be shaped to include a button and the set of emblems may have a corresponding button hole.

When performing tasting rounds with sparkling wines, pouring them into carafes will release their bubbles, and they will then sit in what is a relatively open container releasing more bubbles, before being poured a second time into individual wine glasses or flutes releasing yet more bubbles. In such embodiment, the wine may be poured directly into individual wine glasses or flutes and the stickers may be placed directly onto the wine glasses or flutes, in order to reduce the release of bubbles.

In reference to the above embodiment and variations thereof, the Host Card, the Special Guest Card and the Recognition Challenge Card have been disclosed. The structure and content of these cards and notes can vary in a number of ways without departing from the scope of the present invention. For example, numbers may be printed on the Host Card with corresponding spaces for wines to be written down. Alternatively, the Special Guest Card may have a column with symbols with corresponding spaces for numbers to be written down. In a variation, rather than writing down numbers, symbols or wines on the Host Card, Special Guest Card or the Recognition Challenge Card, stickers are provided to be placed in the provided spaces. In another variation, neither the wines nor numbers nor symbols are printed on the Cards, with stickers placed in appropriate spaces instead. These stickers can have wine names, numbers and/or symbols, or any indicia that matches what appears on the wine sleeves, covers, etc. These stickers can be permanent or reusable.

Additional non-limiting examples of the Recognition Challenge Cards, the Host Cards, and the Special Guest Cards that are more appropriate for one or more of the variations described herein are illustrated in FIGS. 7A-7H. FIGS. 7A and 7F show other variants of the Recognition Challenge card that can be used by any one of the participants in the blind tasting rounds. FIGS. 7B, 7C and 7G show other variants of the Host Card that can be used to single-blind the wine bottles. FIGS. 7D, 7E and 7H show other variants of the Assistant Card or the Special Guest Card that can be used to double-blind the wine bottles.

Other inventions have previously been described that relate to wine tasting, but such prior inventions have their limitations with respect to the objectives identified above. For example, none of the prior inventions have considered "double blinding" the wines such that a host who initially places the wines into different sleeves can also participate in the wine tasting. Moreover, none of the prior inventions are concerned with revealing the wines in the specific fashion as discussed in the present disclosure. In accordance with various embodiments of the present invention, entertaining and well-managed private home wine tasting events can be held for everyone's enjoyment.

While the exemplary system and method as shown and described above are discussed in the context of a number of embodiments and variations thereof, it is to be understood that other expedients known to those skilled in the art may be employed without departing from the spirit of the invention.

What is claimed is:

1. A system for conducting a wine tasting event with a plurality of participants for a plurality of distinct wines having a plurality of distinct identities, the system comprising:

a plurality of sleeves configured to mask a plurality of wine bottles containing a plurality of distinct wines, wherein the sleeves are identifiable by a plurality of distinct identifiers visibly displayed on the plurality of sleeves;

a plurality of distinct covers configured to be removably attached to and placed over the plurality of distinct identifiers on the sleeves to mask the plurality of distinct identifiers such that the distinct identifiers are no longer visible on the sleeves and the distinct covers are visibly displayed on the sleeves;

a first recording material for a first participant of the plurality of participants, the first recording material containing an instruction instructing the first participant to, during a first phase of an initial setup of the wine tasting event:
 (i) privately mask the plurality of wine bottles in the plurality of sleeves with the distinct identifiers visibly displayed on the plurality of sleeves and the plurality of sleeves covering the distinct labels of the plurality of wine bottles such that the distinct labels are not visible, and
 (ii) privately record, for each wine bottle, a correspondence between the distinct identity of the distinct wine in the wine bottle based on the distinct label of the wine bottle, and the distinct identifier of the sleeve in which the wine bottle is placed; and
a second recording material for a second participant of the plurality of participants, the second recording material containing an instruction instructing the second participant to, during a second phase of the initial setup of the wine tasting event:
 (i) privately mask the distinct identifiers visibly displayed on the sleeves with the distinct covers such that the distinct identifiers are no longer visible on the sleeves and the distinct covers are visibly displayed on the sleeves; and
 (ii) privately record, for each of the distinct identifiers, the distinct cover placed over and masking the distinct identifier.

2. The system of claim 1, further comprising:
an additional instruction material configured to instruct carrying out the following steps:
record guesses, by the plurality of participants, of the plurality of identities of the plurality of distinct wines in the wine bottles, wherein each guess associates a particular one of the wine identities with a particular one of the distinct covers;
announce a first wine identity of the plurality of wine identities;
identify, by the private recording of the first person, the distinct identifier of the sleeve in which the wine bottle which has the distinct wine having the first wine identity has been placed; and
reveal, by the private recording of the second person, and based on the distinct identifier identified by the private recording of the first person, which of the distinct covers corresponds to the first wine identity.

3. The system of claim 2, wherein the additional instruction material is a video clip pre-recorded by a guide providing verbal instructions for conducting the wine tasting event.

4. The system of claim 1, further comprising:
a plurality of Tasting Notes Cards configured to allow the plurality of participants to record observations about wine being tasted during a label seen wine tasting event preceding the wine tasting event.

* * * * *